United States Patent [19]
White

[11] Patent Number: 4,504,949
[45] Date of Patent: Mar. 12, 1985

[54] STIMULATED ANTI-STOKES RAMAN UP-CONVERTER

[75] Inventor: Jonathan C. White, Lincroft, N.J.

[73] Assignee: AT&T Bell Laboratories, Murray Hill, N.J.

[21] Appl. No.: 421,045

[22] Filed: Sep. 22, 1982

[51] Int. Cl.³ .............................................. H01S 3/30
[52] U.S. Cl. ...................................... 372/3; 307/425; 307/426
[58] Field of Search ..................... 372/3; 307/425, 426

[56] References Cited

U.S. PATENT DOCUMENTS

| | | | |
|---|---|---|---|
| 4,144,464 | 3/1979 | Loree et al. | 307/426 |
| 4,151,486 | 4/1979 | Itzkan et al. | 372/3 |
| 4,213,060 | 7/1980 | Byer et al. | 307/426 |
| 4,218,628 | 8/1980 | Harris | 307/426 |
| 4,239,995 | 12/1980 | Feldman et al. | 307/426 |

OTHER PUBLICATIONS

Ehrlich et al.; Alkali-Metal Resonance-Line Lasers Based on Photodissociation"; Appl. Phys. Lett., vol. 34, No. 10, May 15, 1979.

Ehrlich et al.; "Obs. of Stimulated Level Shifting in Inverted Atomic Thallium Populations"; Phys. Rev. Lett., vol. 44, No. 13, Mar. 31, 1980.

Van Veen et al.; "Photofragmentation of Thallium Halides"; Chemical Phys., vol. 55, 1981.

Garman et al.; "Observation of Stimulated Anti-Stokes Raman Scattering in Inverted Atomic Iodine; Phy. Rev. Lett., vol. 33, No. 4, Jul. 22, 1974.

J. C. White; "Inversion of the Na Resonance Line by Selective Photodissociation of NaI"; Appl. Phys. Lett., vol. 33, No. 4, Aug. 15, 1978.

Chilukuri; "Selective Opt. Excitation and Inversions via the Excimer Channel: Superradiance at the Thallium Green Line"; Appl. Phys. Lett., vol. 34, No. 4, Feb. 15, 1979.

White et al.; "Efficiency Studies of the Thallium Anti-Stokes Raman Laser"; IEEE Jour. of Quant. Electronics, vol. QE-18, No. 6, Jun. 1982.

White et al., "Anti-Stokes Raman Laser"; Phys. Rev. A, vol. 25, No. 2, Feb. 1982.

Primary Examiner—William L. Sikes
Assistant Examiner—Léon Scott, Jr.
Attorney, Agent, or Firm—Erwin W. Pfeifle; Wendy W. Koba

[57] ABSTRACT

An anti-Stokes Raman up-converter is disclosed which is capable of up-converting a variety of conventional laser sources. A metal-halide, for example, thallium chloride or thallium iodide, is employed as a lasing medium, and is photodissociated to create a population inversion in a metastable state of the metal ion. An excimer laser, for example, and ArF* or KrF* excimer laser, may be employed to photodissociate the metal-halide in accordance with the present invention. Alternatively, an excimer flashlamp, for example a ArF* or KrF* flashlamp, may be employed to photodissociate the metal-halide in accordance with the present invention. A conventional laser source, for example a $CO_2$ laser or any harmonic of a Nd:YAG laser, is subsequently employed to pump the population inversion from the metastable state to a virtual level near an intermediate state. Anti-Stokes Raman lasing occurs from this virtual state, where the lasing frequency is greater than the frequency of the conventional laser pump source.

11 Claims, 3 Drawing Figures

| PUMP SOURCE | λ (PUMP) | λ (ANTI-STOKES) |
|---|---|---|
| $CO_2$ | 10.6 μm | 1.14 μm |
| Nd YAG | 1.06 μm | 582 nm |
| 2×Nd YAG | 532 nm | 376 nm |
| 3×Nd YAG | 355 nm | 278 nm |
| Xe Cl | 308 nm | 248 nm |
| KrF | 248 nm | 208 nm |
| Kr Cl | 222 nm | 189 nm |
| ArF | 193 nm | 168 nm |
| $F_2$ | 157 nm | 140 nm |
| XeF | 351 nm | 276 nm |
| $N_2$ | 337 nm | 267 nm |

STIMULATED ANTI-STOKES RAMAN UP-CONVERTER

BACKGROUND OF THE INVENTION

1. Field of the Invention

The present invention relates to a stimulated anti-Stokes Raman up-converter, and more particularly, to an anti-Stokes Raman up-converter in which photodissociation of a metal halide is used to create a population inversion in a metastable state of the metal, where the population may thereafter be pumped with a conventional laser to produce as an output anti-Stokes Raman emission at a higher frequency than that produced by the conventional laser alone.

2. Description of the Prior Art

An anti-Stokes Raman laser may be defined as stimulated anti-Stokes Raman emission induced by a pump laser between two levels of the same parity in which a population inversion exists between the upper and lower Raman states. Such laser devices are particularly attractive since they are tunable by tuning the pump laser and, because the upper Raman state is often a metastable level, large inversion densities and high anti-Stokes output energies are possible. Early work in this area is reported in an article entitled "Observation of Stimulated Anti-Stokes Raman Scattering in Inverted Atomic Iodine" by R. L. Carman et al appearing in *Physical Review Letters*, Vol. 33, No. 4, July 22, 1974 at pp. 190–193. As described therein, measurable gain in inverted I atoms may be obtained, where the I*($5p^52P^0_{\frac{1}{2}}$) state is populated by flash photolysis of the trifluoromethyliodide ($CF_3I$). The anti-Stokes Raman signal may be observed by pumping this inversion with the fundamental of a Nd:YAG (yttrium aluminum garnet) laser at 106 $\mu$m and probing with a broadband dye laser. The article goes on to state, however, that superfluorescent emission at the nonresonant anti-Stokes wavelength was not observed during these experiments.

Over the past few years a wide variety of lasers and population inversions along dipole-allowed transitions have been created in various metals by selective photodissociation of metal compounds, in particular metal halides. One such series of alkali-metal lasers are described in an article entitled "Alkali-Metal Resonance-Line Lasers Based on Photodissociation" by D. J. Ehrlich et al appearing in *Applied Physics Letters*, Vol. 34, No. 10, May 15, 1979 at pp. 655–658.

A recent paper entitled "Photofragmentation of Thallium Halides" by N. J. A. Van Veen et al appearing in *Chemical Physics*, Vol. 55, pp. 371–384 discusses a study of photofragment production of TlCl, among other metal halides. According to the article, either a KrF or ArF photodissociating laser will selectively produce Tl* in the upper split ground state 7793 cm$^{-1}$ above ground. However, the experiments related to this study were unsuccessful in producing any lasing emission.

There remains in the prior art, however, no anti-Stokes Raman laser arrangement capable of photodissociating metal halides wherein a population inversion is created in a metastable, non-dipole-allowed transition state of the metal atom.

SUMMARY OF THE INVENTION

The present invention relates to a stimulated anti-Stokes Raman up-converter, and more particularly, to an anti-Stokes Raman up-converter which is capable of photodissociating a metal halide to create a population inversion in a metastable state of the metal, where the population may thereafter be pumped with a conventional laser to produce as an output anti-Stokes Raman emission at a higher frequency than that produced by the conventional laser alone.

It is an aspect of the present invention to provide a population inversion to a metastable state, instead of dipole-allowed state, since the metastable population may be stored over a long period of time and then rapidly extracted with an intense pump laser.

Yet another aspect of the present invention is to provide a means for up-converting a variety of conventional lasers, for example, $CO_2$ lasers, thereby greatly increasing the useful frequency range of many conventional lasers.

Other and further aspects of the present invention will become apparent during the course of the following description and by reference to the accompanying drawings.

DETAILED DESCRIPTION

In accordance with the present invention, some fraction of thallium (Tl) salt may be dissociated to yield Tl($6p^2P^0_{\frac{1}{2}}$) ground state atoms. The inherent nonselectivity in the dissociation process defines the ultimate efficiency that may be realized in the anti-Stokes process. If a strong pumping field is tuned near a dipole-allowed resonance in the Tl atom, the metastable and ground states may be connected via a two-photon, anti-Stokes Raman scattering process. Gain at the anit-Stokes wavelength is observable when the initial Raman level has a population inversion with respect to the final Raman level. An up-converter is formed in accordance with the present invention by employing any one of a plurality of conventional lasers, some of which are listed in FIG. 3, as the source of the above-described pumping field.

Figures 1, 3:
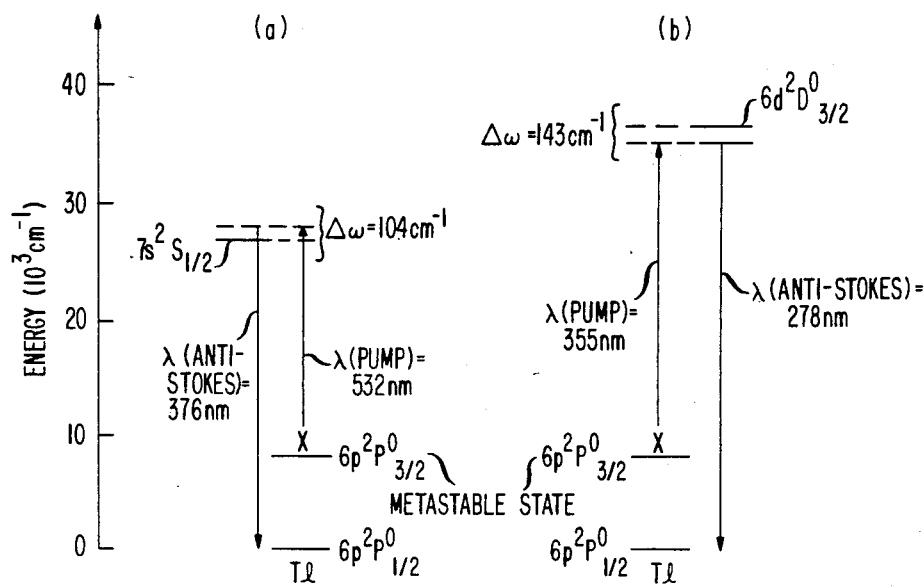
FIG. 1 illustrates the pertinent energy levels for two exemplary up-conversion processes performed in accordance with the present invention.
FIG. 3 comprises a table including a plurality of conventional laser sources and the up-converted frequencies related thereto in accordance with the present invention.

Two examples of the application of the present invention are illustrated in the energy level diagram of FIG. 1. In FIG. 1(a), ground state Tl is moved to occupy the metastable state at $6p^2P^0_{3/2}$ by a photodissociation process described in greater detail hereinafter in association with FIG. 2. The population at the metastable state is then pumped with the second harmonic of a Nd:YAG laser at 523 nm to a virtual state near the $7s^2S_{\frac{1}{2}}$ energy level, resulting, as shown in FIG. 1(a), in an anti-Stokes Raman laser at 376 nm terminating on the Tl ground state. Thus, in accordance with the present invention, the output of the Nd:YAG laser was up-converted from 532 nm to 376 nm. In FIG. 1(b), the third harmonic of a Nd:YAG laser at 355 nm is utilized as the pump source instead of the second harmonic at 532 nm. The metastable population is moved to a virtual state near the $6d^2D^03/2$ energy level, resulting in anti-Stokes Raman emission at 278 nm back to the Tl ground state. In this case, therefore, the Nd:YAG laser output was up-converted from 355 nm to 278 nm.

Figure 2:
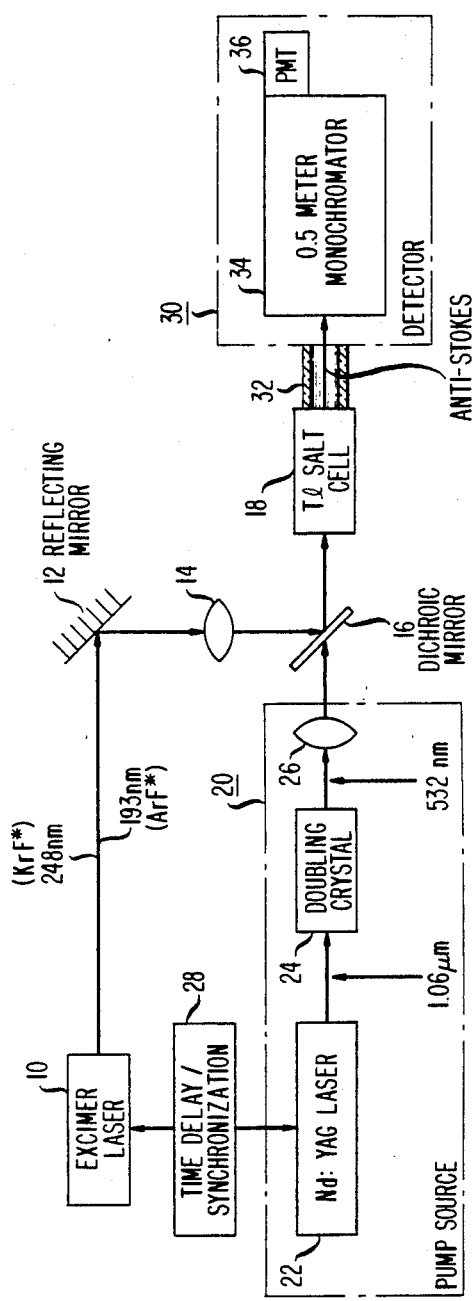
FIG. 2 illustrates a block diagram of an exemplary anti-Stokes Raman laser arrangement capable of up-converting conventional laser sources in accordance with the present invention.

An exemplary apparatus capable of performing the above-described process is illustrated in FIG. 2. As mentioned hereinbefore, to create the necessary metastable Tl population, the ground state Tl is photodissociated, where in accordance with the present invention, an excimer laser 10 is used to photodissociate the Tl salt. Excimer laser 10 may comprise any of the well-known excimer lasing sources, two examples being KrF* and ArF*. Absorption of a KrF* laser photon at 248 nm by thallium chloride (TlCl) or thallium iodide (TlI) results primarily in dissociation along the paths $$TlCl + \gamma(248\ nm) \to Tl^*(6p^2P^0_{3/2}) + Cl \tag{1}$$

or $$TlI + \gamma(248\ nm) \to Tl^*(6p^2P^0_{3/2}) + I, \tag{2}$$

for TlCl, where either TlCl or TlI is an acceptable source of Tl in accordance with the present invention. Alternatively, absorption of an ArF* excimer laser photon at 193 nm results in photodissociation along the paths $$TlCl + \gamma(193\ nm) \to Tl^*(6p^2P^0_{3/2}) + Cl \to Tl^*(6p^2P^0_{3/2}) + Cl^*, \tag{3}$$

where, since the splitting of the Cl ground state is small, both Cl and Cl* are produced in an undetermined ratio. Since employing either ArF* or KrF* as excimer laser 10 produces no ground state atoms, the $6p^2P^0_{3/2}$ metastable state is inverted with respect to ground. It is to be understood that the coherence properties of the excimer laser are not necessary, and an ArF* or KrF* excimer flashlamp could be used in place of a laser source in accordance with the present invention.

As shown in FIG. 2, the output of excimer laser 10 is reflected off of a reflecting mirror 12, focused through a focusing lens 14, for example a CaF2 lens, and reflected off a dichroic mirror 16 towards a salt oven 18. Salt oven 18 contains the Tl lasing material, for example, TlCl or TlI, and may comprise a simple stainless-steel oven with cold, unaligned CaF2 windows. Any inert buffer gas, for example, argon or helium, may be employed to prevent TlCl or TlI vapor condensation on the windows. A pump source 20 illustrated in FIG. 2 is capable of producing a 532 nm output, corresponding to the pumping field discussed hereinabove in association with FIG. 1(a). It is to be understood that many alternative pump sources exist, where an exemplary listing of such sources, along with the up-converted outputs derived therefrom in accordance with the present invention, is contained in the listing of FIG. 3.

As mentioned hereinabove in association with FIG. 1(a), and shown in FIG. 2, the primary source of the 532 nm pump is a Nd:YAG laser 22. Nd:YAG laser 22, as seen by reference to FIG. 3 produces a laser output at 1.06 μm. The second harmonic is generated by passing the output of Nd:YAG laser 22 through a doubling crystal 24, for example, a KH2PO4(KDP) crystal, thus yielding an output at the desired 532 nm. The output of doubling crystal 24 is subsequently passed through a focusing lens 26 and dichroic mirror 16 and applied as a second input to salt oven 18.

Temporal overlap of the photodissociating beam from excimer laser 10 and the pump beam from pump source 20 is controlled by a time delay/synchronization means 28. Time delay/synchronization means 28 first initiates excimer laser 10, thereby allowing the thalliun compound to be sufficiently dissociated before the pump wave arrives at salt oven 18. The lasing output of salt oven 18, which is the desired up-converted anti-Stokes Raman emission, may be observed by a detector 30 which is coupled to the output of salt oven 18 via an evacuated tube 32. In one form, detector 30 may comprise a 0.5 meter monochrometer 34 equipped with a photomultiplier tube (PMT) 40.

FIG. 3, as mentioned hereinbefore, contains a table listing various lasers which may be up-converted in accordance with the present invention. For example, if a CO2 laser is employed as pump source 20 in the arrangement illustrated in FIG. 2, the output will be up-converted from 10.6 μm to 1.06 μm at the output of salt oven 18. Alternatively, an F2 laser may be employed as pump source 20, where the output therefrom will be up-converted from 157 nm to 140 nm. It is to be understood that the list contained in FIG. 3 is exemplary only, and an up-converted formed in accordance with the present invention may be employed to up-convert many alternate laser sources.

What is claimed is:

1. An anti-Stokes Raman up-converter comprising
    a metal-halide Raman lasing medium including a ground state, an intermediate state, and at least one metallic metastable state;
    means for photodissociating said metal-halide Raman lasing medium and creating a population inversion in a metastable state of the metallic atom; and
    a pump source capable of producing a lasing output at a first frequency, said metallic atom population inversion responsive to the pump source lasing output for moving said metallic atom population inversion from said metastable state to a virtual state near said intermediate state and producing as an output anti-Stokes Raman lasing emission at a second frequency, wherein said second frequency is greater than said first frequency.

2. An anti-Stokes Raman up-converter formed in accordance with claim 1 wherein said up-converter further comprises
    time delay/synchronization means for separately initiating both the photodissociating means and the pump source such that the output from said photodissociating means arrives at the metal-halide Raman lasing medium a predetermined time interval before the output from said pump source.

3. An anti-Stokes Raman up-converter formed in accordance with claims 1 or 2 wherein the photodissociating means comprises an excimer lasing source.

4. An anti-Stokes Raman up-converter formed in accordance with claim 3, wherein the excimer pumping source comprises an ArF* excimer laser.

5. An anti-Stokes Raman up-converter formed in accordance with claim 3 wherein the excimer pumping source comprises a KrF* excimer laser.

6. An anti-Stokes Raman up-converter formed in accordance with claims 1 or 2 wherein the photodissociating means comprises an excimer flashlamp source.

7. An anti-Stokes Raman up-converter formed in accordance with claim 6 wherein the excimer flashlamp source comprises an ArF* excimer flashlamp.

8. An anti-Stokes Raman up-converter formed in accordance with claim 6 wherein the excimer flashlamp source comprises a KrF* excimer flashlamp.

9. An anti-Stokes Raman up-converter formed in accordance with claims 1 or 2 wherein the metal-halide Raman lasing medium comprises a thallium halide compound.

10. An anti-Stokes Raman up-converter formed in accordance with claim 9 wherein the thallium halide compound comprises thallium chloride (TlCl).

11. An anti-Stokes Raman up-converter formed in accordance with claim 9 wherein the thallium halide compound comprises thallium iodide (TlI).

* * * * *